Figure 1:
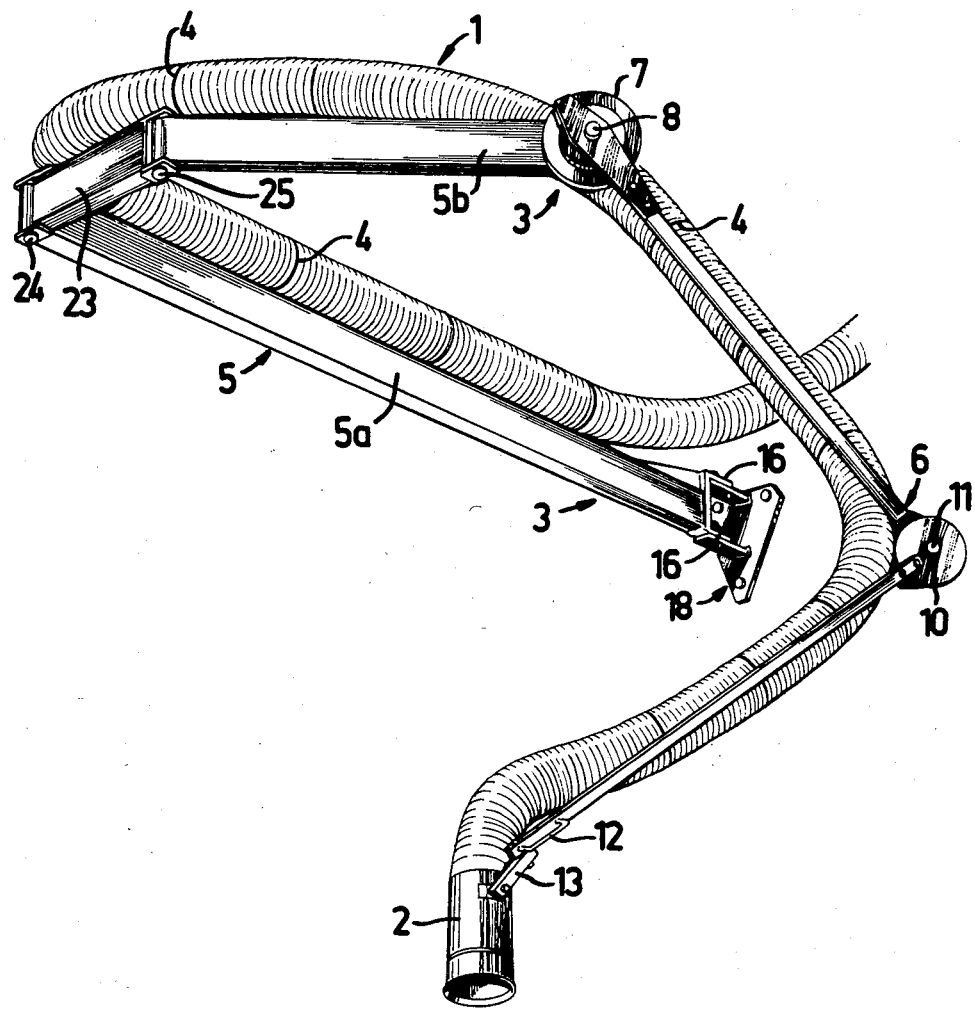

United States Patent [19]

Lundström

[11] Patent Number: 4,541,327
[45] Date of Patent: Sep. 17, 1985

[54] LOCAL EXTRACTION DEVICE
[75] Inventor: Barry Lundström, Skellefteå, Sweden
[73] Assignee: Fumex AB, Skellefteå, Sweden
[21] Appl. No.: 588,117
[22] Filed: Mar. 9, 1984
[51] Int. Cl.⁴ .............................................. F24F 11/00
[52] U.S. Cl. ..................................... 98/115.4; 248/75; 248/278
[58] Field of Search .................. 98/115 VM; 128/910; 248/75, 278, 279, 280.1; 406/113, 115

[56] References Cited

U.S. PATENT DOCUMENTS

| | | | |
|---|---|---|---|
| 224,663 | 2/1880 | Donaldson | 248/278 X |
| 961,552 | 6/1910 | Stouffer | 248/278 X |
| 1,063,220 | 6/1913 | Seamon | 248/278 |
| 3,297,291 | 1/1967 | Everett | 248/278 |

FOREIGN PATENT DOCUMENTS 2004056  3/1979  United Kingdom .......... 98/115 VM

Primary Examiner—Harold Joyce
Attorney, Agent, or Firm—Fitch, Even, Tabin & Flannery

[57] ABSTRACT

A device for spot or local extraction of polluted air, dust and other gases and particles from a room, comprising a flexible hose connected to a suction pipe or fan and a supporting member carrying the hose and mounted on a wall or other preferably vertical surface in the room for pivotal movement about a preferably vertical axle. For achieving great range independently of the ceiling height in the room, in which the device is to be used, the supporting member comprises a hinged supporting arm, which is pivotal about said axle, and each joint axle of which is located in parallel with said axle, and an operating arm, which by a friction joint is connected to the outer end of the supporting arm for movement about an axle perpendicular in relation to the joint axle or axles of the supporting arm.

5 Claims, 3 Drawing Figures

LOCAL EXTRACTION DEVICE

This invention relates to a device for spot or local extraction of polluted air and dust from a work room, comprising an extraction nozzle, which is connected by a flexible hose to a suction pipe or fan, and a supporting arm, which is hingedly attached to a preferably vertical surface in the work room and carries said hose and nozzle.

Extraction devices of the aforesaid type normally are called local extraction devices and are used primarily for evacuating gases developing during welding operations at a welding work place. These known local extraction devices comprise in principle a flexible hose, which is connected to a suction pipe or fan and carried by a supporting arm, which is attached to a wall or the like so as to be pivotal in a horizontal plane, i.e. about a vertical axle. The supporting arm normally comprises one or two joints of friction type, which permit movement of the supporting arm portions relative to each other about horizontal axles, so that the hose end acting as extraction nozzle can be adjusted to assume different positions in vertical planes through the supporting arm and by frictional action to retain the nozzle in the adjusted position.

These known local extraction devices have the disadvantage, that their range is restricted by far too much by the ceiling height in the room, in which the devices are intended to be used. When, for example, extraction is to be effected from a work place, for example a grinding machine, adjacent the wall, on which the extraction device is mounted, the supporting arm portion located between the two friction joints extends upward from the attachment point of the device on the wall. The known local extraction devices, therefore, require free space above the attachment points on the wall. The greater the range of the extraction device, the greater the ceiling height required. It was found, further, that at the known local extraction devices the hose often is subjected to very abrupt bendings, which involve a great risk of hose ruptures resulting therefrom.

The present invention, therefore, has the object to provide a local extraction device, which does not show the aforesaid diasdvantages, but is designed so that its range is independent of the ceiling height in the room where the device is to be used, and the hose of the device is not subjected to abrupt bendings.

This object is achieved in that the local extraction device according to the invention has been given the characterizing features defined in the attached claims.

Figure 2:
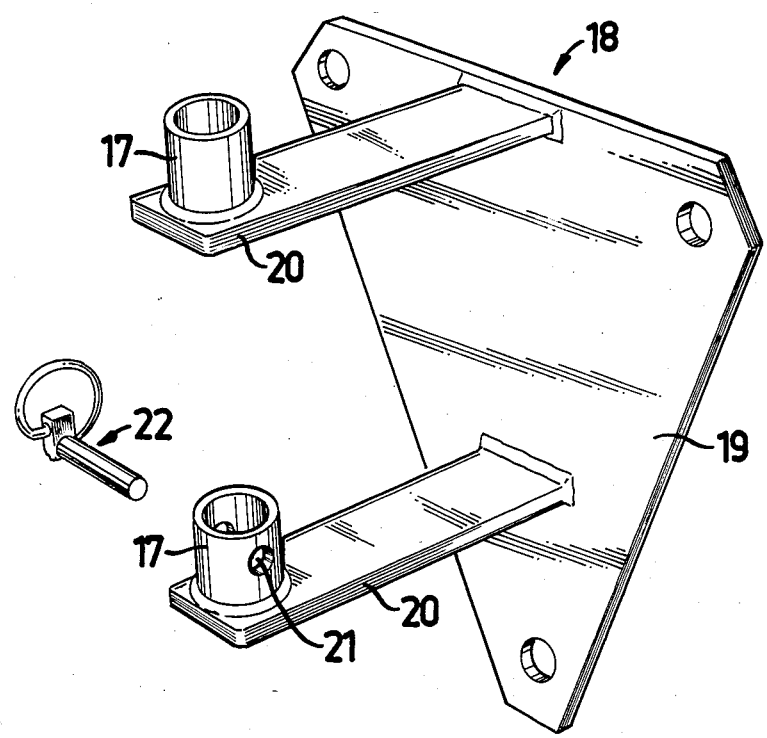
Figure 3:
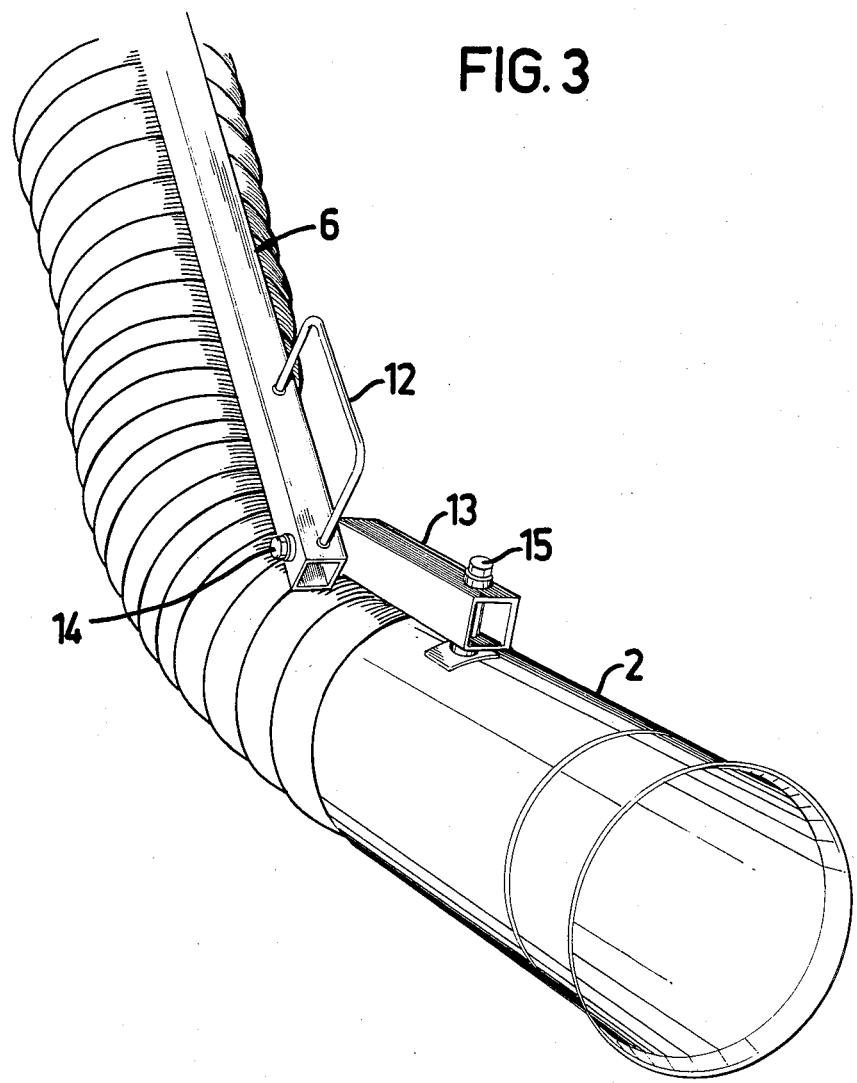

The invention is described in greater detail in the following, with reference to the accompanying drawings, in which FIG. 1 is a perspective view of a local extraction device according to the invention mounted on a wall, FIG. 2 is a perspective view of a mounting bracket for pivotally carrying a supporting member comprised in the local extraction device, and FIG. 3 is a perspective view illustrating the attachment of the extraction nozzle of the local extraction device on the supporting member.

The local extraction device according to the present invention comprises at the embodiment shown by way of example in the drawings a flexible hose 1, which is connected to a suction pipe or fan (not shown) and at its free end is provided with an extraction nozzle 2 made of sheet metal, plastic or corresponding material. The local extraction device further comprises a supporting member 3, which carries the hose 1, and on which the hose 1 is retained by a plurality of strip clips 4 arranged in spaced relationship to each other and connected to the supporting member. Said clips can be opened and closed and are of some kind known per se.

The supporting member 3 according to the invention consists of a supporting arm 5 hingedly attached to a wall or other substantially vertical surface and of an operating arm 6 hingedly attached to the supporting arm end remote from the wall. The operating arm 6, more precisely, is connected to the supporting arm 5 by a friction joint 7 with a stepped catch known per se, which joint permits pivotal movement of the operating arm 6 about a horizontal joint axle 8 relative to the supporting arm 5 and maintains the operating arm 6 in each position set relative to the supporting arm. The operating arm 6 further comprises a second friction joint 10, of which the joint axle 11 is in parallel with the joint axle 8 of the first friction joint and permits relative movement between the arm portions located on both sides of the joint 10 and retains these portions in each position set. The friction or holding forces of the two friction joints are adjustable in a manner known per se by tightening more or less the joint axles 8 and 11, which are designed as bolts with nuts.

At the operating arm end remote from the supporting arm 5, a control handle 12 (FIG. 3) is provided, and a link 13 is connected pivotally to said operating arm end by a pin bolt 14. The extraction nozzle 2 also is pivotally connected to said link 13 by a pin bolt 15 located perpendicularly in relation to the bolt 14 constituting the connecting joint between the operating arm 6 and link 13.

Due to this pivotal suspension of the extraction nozzle 2 in two perpendicular planes, the nozzle can be directed in any direction, thereby yielding greatest possible evacuation effect from a work place, for example a welding work place, machine tool etc.

The supporting arm 5 comprised in the supporting member 3 of the local extraction device, at the end of which arm 5 the operating arm 6 is pivotally suspended, is in its turn pivotally suspended by means of pivot holes in projecting flanges 16 on two pins 17 (FIG. 2) located in spaced relationship above each other of a bracket 18, which is rigidly mounted, for example by bolts, on a wall or other surface and comprises platform supports 20 projecting from a mounting plate 19, above which platform supports the pins 17 are located, and the flanges 16 of the supporting arm abut the upper surface of said platform supports. The lower pin 17 of the bracket hereby is subjected to pressure forces, and the upper pin 17 is subjected to tensile forces. For this reason, the mounting plate 19 of the bracket must be especially firmly secured in the wall, for example by means of several bolts, in order to take up arising tensile forces. In order to prevent the supporting arm 5 from unintentionally disengaging from the pins 17 of the bracket, at least one of the pins is provided with a through hole 21 for a locking cotter 22, which inserted into its pin extends over the flange 16 of the supporting arm.

The pins 17 carrying the supporting arm 5, thus, constitute an axle, about which the supporting arm 5 is pivotal in a horizontal plane. In normal applications this axle is located vertically, contrary to the axles 8 and 11 of the friction joints which shall be located perpendicularly in relation to the pivot axle 17 of the supporting arm.

The supporting arm 5 consists of an inner supporting arm portion 5a and an outer supporting arm portion 5b. A link 23 is located between these portions. Said link 23 is connected pivotally to the outer end of the inner supporting arm portion by an axle journal 24 in parallel with the pins 17 and to the inner end of the outer supporting arm portion by an axle journal 25 in parallel with the axle journal 24. The link 23 can be pivoted in relation to the inner supporting arm portion through about 180°, and the outer supporting arm portion 5b in its turn can be pivoted through about 180° in relation to the link 23. This implies, that the outer supporting arm portion 5b can be pivoted to a position in parallel with the inner supporting arm portion 5a on both sides of the same.

Owing to the link 23, the hose at pivotal movement of the supporting arm to the aforementioned position is bent in a very protective way, as appears from FIG. 1. In order to restrict the relative movement between the link 23 and the two supporting arm portions 5a and 5b, stop members (not shown) are provided so that the angle cannot be smaller than about 90° between the supporting arm portions 5a,5b and the supporting arm link 23.

Owing to the hinged design of the supporting arm, according to the present invention a local extraction device is obtained, which can be given a great range irrespective of the ceiling height in the room where the device is to be used, and which at the same time is protective to the hose, because the hose is subjected to abrupt bendings to a much smaller extent than is the case at known extraction devices.

The present invention is not restricted to what is set forth above and shown in the drawings, but can be modified and altered in many different ways within the scope of the invention idea defined in the attached claims. The invention, for example, may comprise an operating arm, which is not provided with the friction joint shown in FIG. 1.

What I claim is:

1. A local extraction device for removal of gas and particulate matter from a work area, the local extraction device including a flexible hose for cooperation with suction means, and support means for supporting the hose, the support means comprising:

mounting means for mounting the support means on a generally vertical surface;

a hinged supporting arm supported by the mounting means and pivotal about a substantially vertical axis;

an operating arm pivotally connected to the supporting arm for movement about an axis substantially perpendicular to said substantially vertical axis; and a first friction joint pivotally connecting the operating arm to the supporting arm;

said supporting arm having a rectangular cross-sectional form and comprising an inner arm portion supported by said mounting means, an outer arm portion connected to said operating arm by means of said first friction joint, and link member located between said inner and outer arm portions and connected to the outer end of the inner arm portion by a first pivot for movement about said pivot and to the inner end of the outer arm portion by a second pivot for movement about said second pivot, said pivots being in parallel with each other and with said substantially vertical axis, and said link member having a length shorter than that of the inner arm portion and that of the outer arm portion of said hinged supporting arm.

2. A device as defined in claim 1 wherein the mounting means includes two pins located in spaced relationship, one above the other, and the supporting arm is supported pivotally on said two pins.

3. A device as defined in claim 1 wherein the operating arm includes a second friction joint.

4. A device as defined in claim 2 wherein the operating arm includes a second friction joint.

5. A device as defined in any one of the preceding claims wherein the support means further comprises a link attached to the operating arm and pivotal about a first axis through the link, and wherein the hose includes a nozzle attached to the link and pivotal about a second axis through the link, the first axis though the link being substantially perpendicular to the second axis through the link.

* * * * *